Oct. 9, 1945.  L. F. HEMPHILL  2,386,683
CONTROL SYSTEM
Filed Jan. 26, 1943

Inventor:
Lawrence F. Hemphill,
by Harry E. Dunham
His Attorney.

Patented Oct. 9, 1945

2,386,683

UNITED STATES PATENT OFFICE 2,386,683

CONTROL SYSTEM

Lawrence F. Hemphill, Fort Wayne, Ind., assignor to General Electric Company, a corporation of New York Application January 26, 1943, Serial No. 473,613

7 Claims. (Cl. 172—239)

This invention relates to control systems and more particularly to improvements in automatic speed control systems for electric motors.

Certain electric motors and particularly series connected dynamo-electric motors have relatively poor inherent speed regulation in the sense that they have an excessively high no load or light load speed and a relatively low normal load or full load speed. This is objectionable in many cases and particularly when the motors operate portable tools, such as sanders, drills and saws.

In accordance with this invention there is provided a novel and simple automatic control means which materially reduces the no load or light load overspeed but which does not decrease the high maximum power output of the motor when it is under load. It is not a speed regulator in the conventional sense because it does not respond to motor speed and does not continually adjust the motor circuit so as to maintain the speed constant over a wide range of load.

An object of the invention is to provide a new and improved speed control system for electric motors.

A further object of the invention is to provide a new and improved automatic system for substantially reducing the no load speed of series motors without decreasing the maximum power output of such motors.

The invention will be better understood from the following description taken in connection with the accompanying drawing and its scope will be pointed out in the appended claims.

Figure 1:
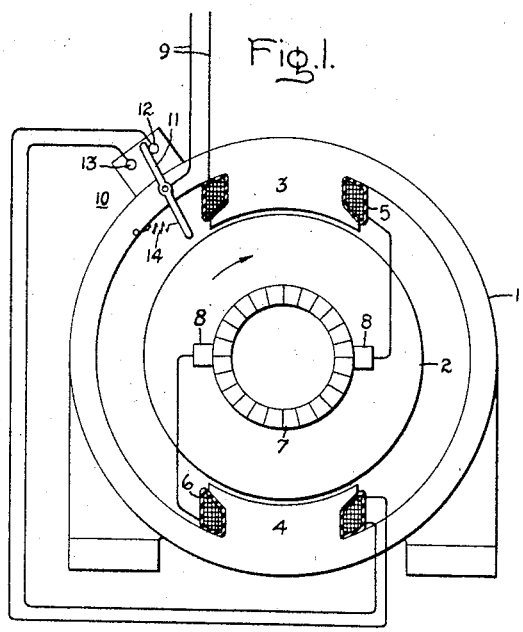
Figure 2:
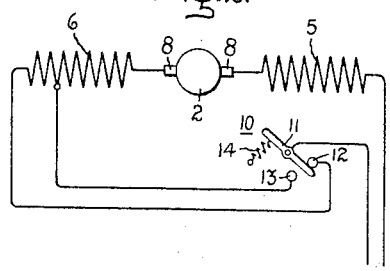

In the drawing Fig. 1 illustrates an embodiment of the invention and Fig. 2 is a circuit diagram thereof.

Referring now to the drawing, the motor is shown as comprising a stator 1 and a rotor or armature 2. The former is provided with a pair of pole pieces 3 and 4 on which are placed field coils 5 and 6 respectively, and the latter is provided with a commutator 7 to which electrical connection is made through brushes 8. The field coils and the armature are connected in series with each other across a supply circuit 9. The motor is thus a so-called series motor. It may be either a direct-current or an alternating-current motor and it is contemplated that in most cases it will be a fractional horsepower motor of the so-called universal type, that is to say, a small motor which will operate on either direct current or alternating current.

Automatic control of the motor speed is secured by means of a switch 10 which is connected in the motor circuit and which changes the effective number of turns of the field coil 6. This may be done by means of an intermediate tap in the field coil 6, which tap will be referred to as the high speed tap. The terminal of the field winding 6 which is not connected to one of the brushes may also be considered a field tap and this will be referred to as the low speed tap. The switch is, in effect, a single-pole double throw switch having a movable member 11 pivotally mounted on the motor and having a pair of fixed contacts 12 and 13 connected respectively to the low and high speed taps. The switch is biased to the position shown in the drawing by any suitable means, such as a spring 14. This is the position of the switch when the motor is deenergized.

The opposite end of the movable member 11 is located near what may be called the leading edge of the pole piece or pole face 3. In other words, the armature 2 of the motor is assumed to have clockwise rotation, as viewed in the drawing, so that the relative rotation of the pole pieces is counter-clockwise whereby the left hand edge of pole piece 3 is its leading edge.

The operation of the illustrated embodiment of the invention is as follows: Assume that the motor is connected to a load and that the supply circuit 9 is energized with the proper voltage. Under these conditions a relatively heavy current will flow through the motor circuit. This will cause a relatively high flux to pass through the armature from one pole to the other and by reason of armature reaction the axis of the flux does not coincide with the axis of the pole pieces but is skewed backward or in the opposite direction to that of the rotation of the armature 2 so that the flux concentration in the pole pieces will be highest in what have been described as their leading edges. Consequently, there will be maximum leakage flux under these conditions from the leading edge of the pole member 3. Spring 14 is so proportioned that under these conditions the magnetic pull on the magnetic vane 11 which constitutes the switch arm will overcome the pull of the spring and cause the switch to make connection with the high speed tap in the field coil 6. In other words, the connections will be such as effectively to remove from the circuit a portion of the field coil 6 so that the motor will tend to draw a heavy current and develop a maximum torque.

If now the motor load is reduced to a low value or is removed, the motor speed will increase and will tend to reach an excessively high value because in order for it to develop the necessary amount of counter E. M. F. its speed will have to be high by reason of the relatively small number of field turns. However, the reduction in armature current causes a corresponding reduction in armature reaction and also a corresponding reduction in field flux so that there is a very marked decrease in flux concentration in the leading edge of the pole piece 3. Therefore, before the speed becomes excessive the magnetic pull on the member 11 will decrease to such a point that the spring 14 will move the switch into contact with the low speed tap, thus, in effect increasing the number of turns in the field coil 6. This means that the motor current corresponding to no load or light load will produce a higher field flux because it passes through more field turns and consequently the motor will not have to rotate as fast in order to develop the requisite counter E. M. F.

By having the switch 10 operated by the flux produced by the coil 5, whereas the switch contacts control the turns in the field coil 6, the operation of the switch is relatively insensitive to the cutting out or cutting in of field turns so that there is no tendency for the switch to be unstable and flutter back and forth.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to obtain by Letters Patent of the United States is:

1. In combination, a direct-current dynamo-electric machine having a series connected armature and field winding, at least one intermediate tap in said field winding, an external circuit for said machine, and means responsive to predetermined variations in flux density in said machine regardless of their frequency for selectively connecting all of said winding and the tapped portion thereof in said circuit.

2. In combination, a series motor having at least two field coils disposed respectively on separate pole pieces and means responsive to the flux density in the leading edge of one of the pole pieces for varying the effective number of turns of the coil on the other pole piece.

3. In combination, a two-pole fractional horsepower series motor, separate serially connected field coils thereon, one of said coils having separate high and low speed taps, a magnetic vane movably mounted on said motor so as to be urged in one direction by the leakage flux from the other field coil, means for biasing said vane in the opposite direction, and means responsive to the motion of said vane for shifting the motor connections from one of said taps to the other.

4. In combination, a direct-current motor having an objectionably large difference between its full load and no load speeds, and auxiliary magnetic means responsive to the difference in magnetic conditions in said motor during no load and substantial load for varying the effective field turns of said motor so as substantially to reduce the no load speed.

5. In combination, a dynamo-electric motor having a stator field frame with at least two pole pieces, an armature mounted between said pole pieces, separate field coils on said pole pieces connected in series with each other and in series with said armature, a switch for effectively removing some of the turns of one of said coils from the motor circuit, and means responsive to the value of leakage flux from the leading edge of the pole piece for the other field coil for controlling said switch.

6. In combination, a dynamo-electric motor having poor inherent speed regulation, said motor having a pole piece the flux density of whose leading edge varies widely between no load and full load by reason of armature reaction, and means responsive to the value of said flux density for decreasing the speed of said motor when said flux density falls below a predetermined value.

7. In combination, a direct-current electric motor having an electromagnetic field structure, a main armature mounted for continuous rotation in the electromagnetic field of said motor, an auxiliary armature mounted for movement toward and away from said field structure, said auxiliary armature being directly magnetically attracted toward said structure by the stray magnetic flux of the latter, means for biasing said auxiliary armature away from said field structure, speed controlling electrical connections for said motor, and means responsive to movement of said auxiliary armature for effectively varying said electrical connections so as to control the speed of said motor.

LAWRENCE F. HEMPHILL.